United States Patent Office 3,701,807
Patented Oct. 31, 1972

3,701,807
N-(1-CYCLOALKEN-1-YL) UREAS AND THIOUREAS
John P. Chupp, Kirkwood, Mo., assignor to Monsanto Company, St. Louis, Mo.
No Drawing. Continuation-in-part of application Ser. No. 721,877, Apr. 16, 1968, which is a continuation of application Ser. No. 523,856, Feb. 1, 1966. This application Nov. 12, 1968, Ser. No. 775,104
Int. Cl. C07c 127/18
U.S. Cl. 260—553 A   11 Claims

ABSTRACT OF THE DISCLOSURE

N-(1-cycloalken-1-yl)ureas and thioureas prepared by the reactions of a N-substituted imine with an isocyanate.
These compounds are useful as biocides, particularly phylotoxicants.

---

This application is a continuation-in-part of U.S. application Ser. No. 721,877, filed Apr. 16, 1968, now abandoned which in turn is a continuation of U.S. application Ser. No. 523,856, filed Feb. 1, 1966, now abandoned The novel N-(1-cycloalken-1-yl)ureas and thioureas of this invention are represented by the formula:

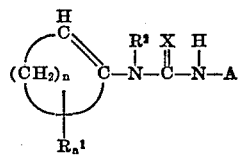

wherein $R^1$ is alkyl having a maximum of three carbon atoms, $a$ one of the integers zero to two; $n$ is one of the integers three to six; $R^2$ is selected from the group consisting of alkyl having a maximum of twelve carbon atoms, alkenyl having at least three and a maximum of eight carbon atoms, provided that the ethylenic linkage is not on the carbon attached to the nitrogen; alkoxy-alkyl having at least two and a maximum of eight carbon atoms; and benzyl; X is selected from the group consisting of oxygen and sulfur; A is selected from the group consisting of (i) Napthyl, substituted naphthyl said substitution having a maximum of four substituents and being selected from the group consisting of alkyl having a maximum of eight carbon atoms, halogen, mono, di- and trihalogenated methyl and nitro, bicycloalkyl and bicycloalkene each having at least seven and a maximum of twelve carbon atoms, substituted bicycloalkyl having a maximum of three substituents and being selected from the group consisting of alkyl having a maximum of eight carbon atoms, halogen, mono, di- and trihalogenated methyl and nitro;

(ii) Alkyl having a maximum of 12 carbon atoms, and alkenyl having a maximum of 12 carbon atoms;

(iii)

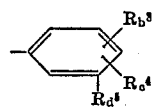

wherein $R^3$ and $R^4$ are independently selected from the group consisting of alkyl having a maximum of four carbon atoms, halogen, alkoxy having a maximum of four carbon atoms, nitro, cyano, mono-, di-, and trihalogenated methyl group, phenyl, phenoxy, benzyl, substituted phenyl, said substituted phenyl having a maximum of three substituents and said substituents being selected from the group consisting of halogen, nitro, alkyl having a maximum of four carbon atoms and alkoxy having a maximum of four carbon atoms, $b$ and $c$ are each one of the integers zero to three, inclusive, provided that the total of $b+c$ is a maximum of three; $d$ is one of the integers zero to one, inclusive, provided that when $d$ is one, $b$ and $c$ are both zero; $R^5$ is the group

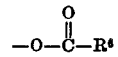

wherein $R^6$ is selected from the group consisting of (i)

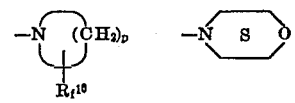

wherein $R^{10}$ is selected from the group consisting of hydrogen and alkyl having a maximum of three carbon atoms; $p$ is an integer four to seven, inclusive; and $f$ is an integer zero to two, inclusive.

(ii)

wherein $R^7$ and $R^8$ are each independently selected from the group consisting of hydrogen, alkyl having a maximum of 12 carbon atoms, cycloalkyl having at least five and a maximum of eight carbon atoms, alkenyl having at least three and a maximum of ten carbon atoms, mono and di-substituted cycloalkyl, said substituent being alkyl having a maximum of three carbon atoms, phenyl substituted phenyl, said substituted phenyl having a maximum of three substituent and said substituent being halogen or alkyl having a maximum of four carbon atoms; arylalkyl having a maximum of ten carbon atoms; and

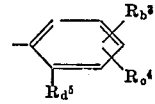

wherein $R^9$ is selected from the group consisting of hydrogen and alkyl having a maximum of three carbon atoms; $e$ is one of the integers zero to two, inclusive; and $m$ is one of the integers three to six, inclusive; provided that both $R^7$ and $R^8$ are not hydrogen and further provided that when either $R^7$ or $R^8$ is alkenyl or cycloalkenyl that the remaining group is other than hydrogen.

In the above formula the group "A" includes but is not limited to naphthyl, hydrindane, decalin, bicyclo[5:3:0]decane, bicyclo[4:2:0]octane, bicyclo[3:3:0]hexane, bicyclo[2,2,2]octane, bicyclo[2,2,1]hept - 2 - ene, bicyclo[2,2,1]heptane, 2 - methylbicyclo[2,2,1]heptane, 2-chloronorcamphane, 1-nitronorcamphane, 5-methylnorborene, norbornadiene, bicyclo[2,1,2,1]decane, 2-methylnaphthyl, 2 - ethylnaphthyl - 2-n-octylnaphthyl, 2,3,6 - trimethylnaphthyl, 2 - chloronaphthyl, and 2-iodonaphthyl.

A preferred embodiment of the compounds of this invention are the compounds in which the group "A" is defined by the group:

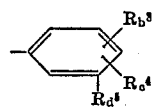

wherein $R^3$, $R^4$, $R^5$, $b$, $c$ and $d$ are as previously defined.
It is also preferred that where the cycloalkenyl groups are substituted that the substitution is in the 2- and 6-positions.

In the above general formula $R^1$ includes but is not limited to methyl, ethyl, n-propyl and iso-propyl; $R^2$ includes but is not limited to methyl, ethyl, propyl, isopropyl, butyl and its isomers, pentyl and its isomers, octyl and its isomers and dodecyl and its isomers, allyl, n-buten-1-yl, n-buten-2-yl, 2-methylpropen-1-yl, n-penten-1-yl, 3-methylbuten-1-yl, n-hexen-2-yl, n-hepten-1-yl, 3,3-dimethylpenten-1-yl, 1-methylhexen-1-yl, n-octen-1-yl and the various homologues and isomeric forms of alkenyl having 3 to 8 carbon atoms; mehoxymethyl, methoxyethyl, methoxypropyl, methoxybutyl, methoxyheptyl, ethoxyethyl, propoxypropyl, ethoxypropyl, ethoxybutyl, butoxybutyl and the like.

The group

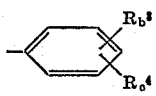

includes, but is not limited to 2-fluorophenyl, 4-bromophenyl, 2-chlorophenyl, phenyl, 4-methylphenyl, 4-t-butylphenyl, 4-biphenyl, 2,4-dibromophenyl, 3,4-dichlorophenyl, 2,4,6-trichlorophenyl, 4-nitrophenyl, 2,6-dinitrophenyl, 2-nitro-4-chlorophenyl, 2,4,6-trifluorophenyl, 3-chloro-4-methylphenyl, 3,4-dimethylphenyl, 3-trifluoromethylphenyl, 4-phenoxyphenyl, 2,6-di(t-butyl-)phenyl, 3,4-di(t-butyl-)phenyl, 4-methoxyphenyl, 3-butoxyphenyl, 2,4-diethoxyphenyl, 3,5-dinitrophenyl, 2'-methyl-4-biphenyl and the like.

One embodiment of the invention encompasses compounds of the formula

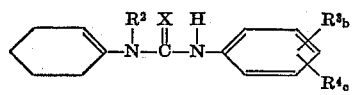

wherein $R^2$ is selected from the group consisting of alkyl having from 1 to 12 carbon atoms and alkoxyalkyl having from 2 to 8 carbon atoms, each $R^3$ is independently selected from the group consisting of alkyl having from 1 to 4 carbon atoms and halogen, each $R^4$ is independently selected from the group consisting of cyano and nitro, $b$ is one of the integers from 0 to 3, inclusive, $c$ is one of the integers from 0 to 2, inclusive, provided that the total of $b$ and $c$ is a maximum of three, and X is selected from the group consisting of oxygen and sulfur.

In the group

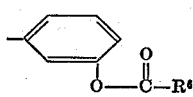

the radical $R^6$ includes but is not limited to pyrroline, piperidine, morpholine, methylamine, dimethylamine, methylbutylamine, t-butylamine, allylamine, cyclohexylamine, 2-methylcyclohexylamine, 2,6-dimethylcyclohexyamine, aniline, 4-propylaniline, 1-cyclohexen-1-yl-methylamine, 2-methyl-1-cyclohexen - 1 - yl-methylamine, 2,6-dipropyl - 1 - cyclohexen - 1 - yl - methylamine, 1 - cyclopenten - 1 - yl - ethylamine, 1 - cyclohepten - 1 - yl-propylamine and the like. A preferred embodiment of this group when $R^6$ is an alkenylamine is the group

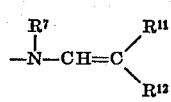

wherein $R^{11}$ and $R^{12}$ are each independently alkyl having one to four carbon atoms.

The N-(1-cycloalken-1-yl) ureas and thioureas of this invention are prepared by a process which comprises reacting an isocyanate or thioisocyanate with an N-substituted-cycloalkylimine in accordance with the following equation:

(1)

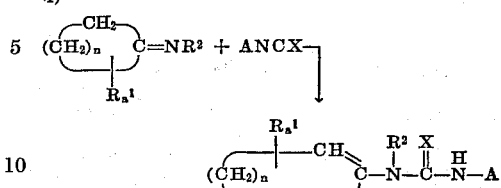

wherein $R^1$, $R^2$, A, X, $a$ and $n$ are as previously defined.

Preparation of compounds in which A is the group

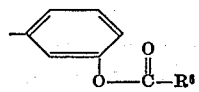

may also proceed by either of the following illustrated sequences (2)

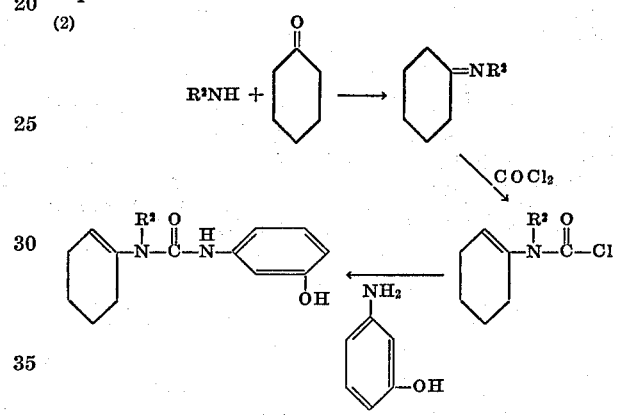

Substituted isocyanate or substituted carbamyl chloride

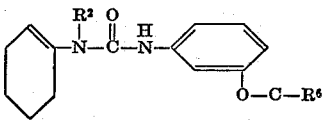

(3)

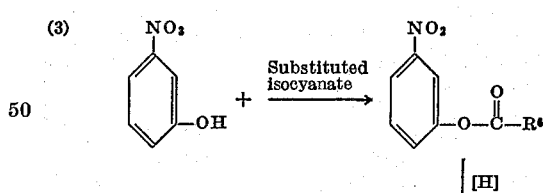

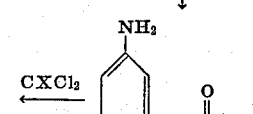

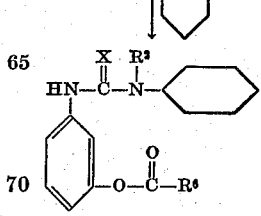

In the above equations, the reaction of the phenolic group is with an isocyanate if the product is a monosubstituted amine and with a carbamyl chloride if the product is a mono or disubstituted amine.

Temperature of reaction is critical but only in regard to the upper limit employed for specific isothiocyanate reactions, according to Equation 1. When the isothiocyanate reactant is a substituted aryl selected from the group consisting of haloaryl, cyanoaryl or nitroaryl isothiocyanate, the reaction temperature is critical and must be maintained below about 35° C. If this process is carried out for a substantial period, with these specific isothiocyanate reactants, at temperatures above about 35° C. thermal rearrangement of the N-(1-cycloalken-1-yl)-N-(substituted aryl)thioureas proceeds according to the following representative example:

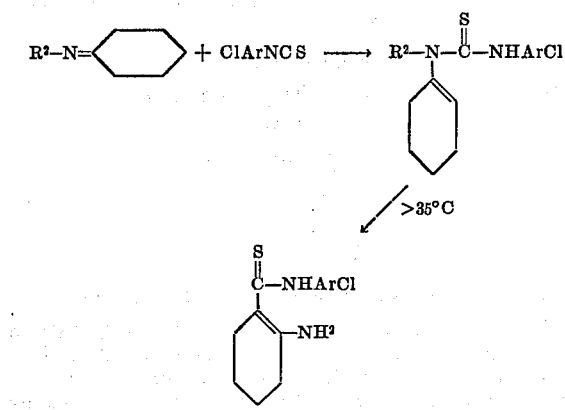

wherein $R^2$ is as previously defined and Ar is aryl. In carrying out the processes of this invention, other than that heretofor specified for selective isothiocyanate, the reaction temperature is not critical and temperatures from about 0° C. to about 100° C. are usually employed with the temperatures from about 20° C. to about 60° C. being preferred.

The process of this invention is usually carried out with substantially equimolar amounts of reactants but an excess of either reactant can be used if desired. The processes are advantageously carried out in the presence of an inert organic medium. Inert organic media which can be used in the practice of this invention include, but is not limited to, hydrocarbons such as benzene, toluene, xylene, cyclohexane, methylcyclohexane, n-hexane, n-heptane and the like, ethers such as tetrahydrofuran, n-butyl ether, 1,4-dioxane, isobutyl ether, diethyl ether and the like, organic halides such as carbon tetrachloride, n-butyl chloride, methylene chloride, ethylene dichloride, tetrachloroethylene and the like, and esters, such as ethyl acetate, propyl acetate and the like, and solvent such as dimethyl sulfoxide, N,N-dimethylformamide and the like.

The separation of the resulting reaction product from the reaction mixture is readily accomplished. The solvent can be removed from the reaction mixture by conventional means, for example, by stripping or distillation, preferably low temperature vacuum distillation. The product, if desired, can be purified by any of the conventional means well known in the art, e.g. extraction, fractional distillation using a carrier gas, film distillation and recrystallization or any suitable combination of these.

In accordance with this invention it has been found that the growth of germinant seeds, emerging seedlings, and established vegetation can be controlled and modified by exposing the seeds, emerging seedlings, or the roots or above-ground portions or established vegetation to the action of an effective amount of one or more of the N-(1-cycloalken-1-yl)ureas and thioureas represented by the formula

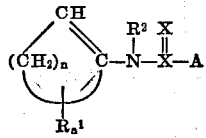

wherein $R^1$, $R^2$, A, X, $n$ and $a$ are as defined above, and in particular compounds of the formula

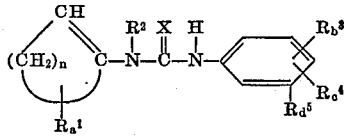

wherein $R^1$, $R^2$, $R^3$, $R^4$, $R^5$, X, $n$, $a$, $b$, $c$ and $d$ are as previously defined. These compounds are effective as general phytotoxicants including post-emergent phytotoxicants and pre-emergent phytotoxicants. Furthermore, these compounds are characterized by a broad spectrum of herbicidal or phytotoxic activity, i.e. they modify the growth of a wide variety of plant systems including both broadleaf and grass plants. For the sake of brevity and simplicity, the term "active ingredient" will be used hereinafter in this specification to describe the novel phytotoxicants of the above formula.

The phytotoxic or herbicidal compositions of this invention contain at least one active ingredient and a material referred to in the art as a phytotoxic adjuvant in liquid or solid form. The phytotoxic compositions are prepared by admixing the active ingredient with an adjuvant including diluents, extenders, carriers, and conditioning agents to provide compositions in the form of finely-divided particulate solids, granules, pellets, solutions and aqueous dispersions or emulsions. Thus the active ingredient can be used with an adjuvant such as a finely-divided particulate solid, a solvent liquid of organic origin, water, a wetting agent, dispersing agent, an emulsifying agent or any suitable combination of these.

Typical finely-divided solid carriers and extenders which can be used in the phytotoxic compositions of this invention include for example, the talcs, clays, pumice, silica, diatomaceous earth, quartz, fuller's earth, salt, sulfur, powdered cork, powdered wood, walnut flour, chalk, tobacco dust, volanic ash, and the like. Typical liquid diluents include for example, kerosene, Stoddard solvent, hexane, benzene, toluene, acetone, ethylene dichloride, xylene, alcohols Diesel oil, glycols, and the like.

The phytotoxic compositions of this invention particularly liquids and wettable particles, usually contain as a conditioning agent one or more surface-active agents in amounts sufficient to render a given composition readily dispersible in water or in oil. By the term "surface-active agent" it is understood that wetting-agents, dispersing agents, suspending agents, and emulsifying agents are included therein.

The term "phytotoxic composition" as used herein and in the appended claims is intended to mean not only compositions in a suitable form for application but also concentrated compositions which require dilution or extension with a suitable quantity of liquid or solid adjuvant prior to application.

The N-(1-cycloalken-1-yl)ureas and thioureas of this invention are also useful as fungicides, insecticides, nematocides, algacides, bactericides, bacteriostats, and fungistats.

The following examples will illustrate the invention. In these examples, as well as in the specification and appended claims, parts and percent are by weight unless otherwise indicated.

EXAMPLE 1

This example describes the preparation of

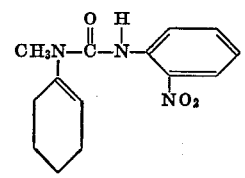

1-(1-cyclohexen-1-yl)-1-(methyl)-3-(o-nitrophenyl) urea

To a solution of 8.2 parts of o-nitrophenyl isocyanate in carbon tetrachloride maintained at room temperature is added about 5.5 parts of N-cyclohexylidene N-methyl amine. An exothermic reaction occurs and the reaction mixture warms to about 30° C. The reaction mixture is cooled to about room temperature (25° C.) and stirred for about 30 minutes. The carbon tetrachloride is stripped off at reduced pressure to recover a reddish-orange solid product which after being re-crystallized twice from ethyl alcohol has a melting point of 120.5–122° C. The assigned structure is confirmed by nuclear magnetic resonance (NMR) spectrum analysis.

Calc'd for $C_{14}H_{17}N_3O_3$ (percent): C, 61.0; H, 6.19; N, 15.3. Found (percent): C, 60.87; H, 6.24; N, 15.61.

EXAMPLE 2

This example describes the preparation of

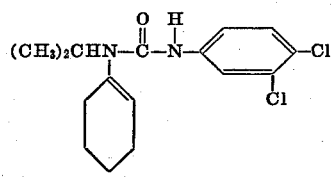

1-(1-cyclohexen-1-yl)-1-(isopropyl)-3-(3,4-dichlorophenyl) urea

To a solution of 18.8 parts of 3,4-dichlorophenyl isocyanate in benzene maintained at room temperature is added about 13.9 parts of N-cyclohexylidene-N-isopropylamine. An exothermic reaction occurs and the reaction mixture warms to about 30° C. The reaction mixture is cooled to room temperature, stirred for about three hours and the benzene stripped off at reduced pressure to recover the oily product. The assigned structure is confirmed by NMR spectrum analysis.

Calc'd for $C_{16}H_{20}N_2OCl_2$ (percent): N, 8.56; Cl, 21.7. Found (percent): N, 7.92; Cl, 19.4.

EXAMPLE 3

This example describes the preparation of

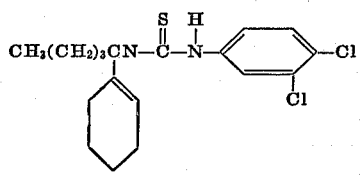

1-(1-cyclohexen-1-yl)-1-(n-butyl)-3-(3,4-dichlorophenyl)-2-thiourea

To a solution of 20.4 parts of 3,4-dichlorophenyl isothiocyanate in carbon tetrachloride maintained at about 15° C. is added about 15.3 parts of N-cyclohexylidene-N-(n-butyl) amine. An exothermic reaction reaction occurs and the reaction mixture warms to about 30° C. The reaction mixture is cooled to about 15° C. and stirred for about one hour. The carbon tetrachloride is stripped off at reduced pressure to recover an oily product which is crystallized from hexane. The solid product amounts to 33 parts and has a melting point of 95–96° C. The assigned structure is confirmed by NMR spectrum analysis.

Calc'd for $C_{17}H_{22}N_2SCl_2$ (percent): C, 57.2; H, 6.26; N, 7.85; S, 8.96. Found (percent): C, 56.58; H, 6.12; N, 7.91; S, 9.21.

EXAMPLE 4

This example describes the preparation of

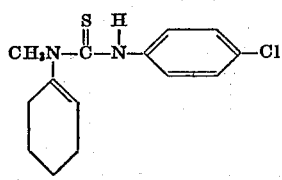

1-(1-cyclohexen-1-yl)-1-methyl-3-(p-chlorophenyl)-2-thiourea

To a solution of 11.1 parts of p-chlorophenyl isothiocyanate in carbon tetrachloride maintained at about 20° C., is added about 16.9 parts of N-cyclohexylidene-N-methyl amine. An exothermic reaction occurs and the reaction mixture warms to about 30° C. The reaction mixture is cooled to about 20° C., and stirred for about four hours. The carbon tetrachloride is stripped off at reduced pressure to recover a solid product which after being recrystallized from hexane has a melting point of 106–107° C. The assigned structure is confirmed by NMR spectrum analysis.

Calc'd for $C_{14}H_{17}N_2SCl$ (percent): C, 60.0; H, 6.07; N, 10.0; Cl, 12.7; S, 11.4. Found (percent): C, 59.28; H, 6.08; N, 10.10; Cl, 12.97; S, 11.79.

EXAMPLE 5

This example describes the preparation of

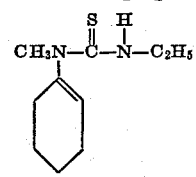

1-(1-cyclohexen-1-yl)-1-(methyl)-3-(ethyl)-2-thiourea

To a solution of 8.7 parts of ethyl isothiocyanate in toluene maintained at about 15° C. is added about 11.1 parts of N-cyclohexylidene N-methyl amine. An exothermic reaction occurs, and the reaction mixture warms to about 30° C. The reaction mixture is cooled to about 20° C. and stirred for about three hours. The solvent is stripped off at reduced pressure and the residue is fractionally distilled to recover the product fraction boiling in the range of 45–55° C., at a pressure of 10 mm. of mercury. The product amounts to about 17 parts and has a melting point of 43–44° C. The assigned structure is confirmed by NMR spectrum analysis.

Calc'd for $C_{10}H_{18}N_2S$ (percent): N, 14.15; S, 16.15. Found (percent): N, 14.15; S, 15.80.

EXAMPLE 6

This example describes the preparation of

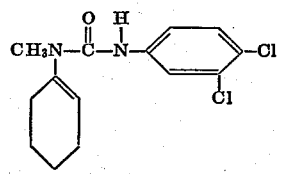

1-(1-cyclohexen-1-yl)-1-(methyl)-3-(3,4-dichlorophenyl) urea

To a solution of 18.8 parts of 3,4-dichlorophenyl isocyanate in toluene maintained at about 15° C. is added about 11.1 parts of N-cyclohexylidene N-methyl amine. An exothermic reaction occurs, and the reaction mixture warms to about 35° C. The reaction mixture is cooled to room temperature and stirred for about 30 minutes. The toluene is stripped off at reduced pressure to recover 22 parts of oily product. The assigned structure is confirmed by NMR spectrum analysis.

Calc'd for $C_{14}H_{16}N_2OCl_2$ (percent): C, 56.2; N, 9.36. Found (percent): C, 55.57; N, 9.36.

EXAMPLE 7

This example describes the preparation of

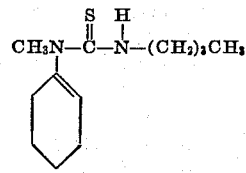

1-(1-cyclohexen-1-yl)-1-(methyl)-3-(n-butyl)-2-thiourea

To a solution of 11.5 parts of n-butylisothiocyanate in toluene maintained at about 15° C., is added about 11.1 parts of N-cyclohexylidene N-methyl amine. An exothermic reaction occurs and the reaction mixture warms to about 30° C. The reaction mixture is cooled to room temperature and stirred for about 24 hours. The solvent is stripped off at reduced pressure and the residue is fractionated to recover the product oil. The assigned structure is confirmed by NMR spectrum analysis.

Calc'd for $C_{12}H_{22}N_2S$ (percent): N, 12.4; S, 14.15. Found (percent): N, 12.28; S, 14.02.

EXAMPLE 8

This example describes the preparation of

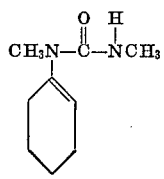

1-(1-cyclohexen-1-yl)-1-(methyl)-3-methyl urea

To a solution of 8.4 parts of methyl isocyanate in toluene maintained at about 20° C. is added about 15.7 parts of N-cyclohexylidene N-methylamine. An exothermic reaction occurs and the reaction mixture warms to about 35° C. The reaction mixture is cooled to room temperature and stirred for about 2 hours. The solvent is stripped off at reduced pressure to recover the product oil. The assigned structure is confirmed by NMR spectrum analysis.

Calc'd for $C_9H_{16}N_2O$ (percent): C, 64.3; H, 9.52; N, 16.65. Found (percent): C, 63.14; H, 9.53; N, 16.56.

EXAMPLE 9

This example describes the preparation of

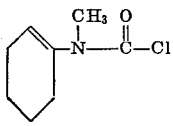

To a solution of 124 parts phosgene in benzene, was added with stirring and cooling, 132 parts N-cyclohexylidine-N-methyl amine in benzene at a rate to maintain a reaction temperature of about 20° C. After addition of the amine, the reaction mixture was refluxed for about 2 hours. Mixture was filtered and benzene removed from filtrate. Residue distilled collecting oil distilling at about 93° C./0.5 mm. Product identified by nuclear magnetic resonance (NMR) spectrum analysis and IR.

Calc'd for $C_8H_{12}ClNO$ (percent): Cl, 20.4; N, 8.05. Found (percent): Cl, 20.43; N, 8.00.

EXAMPLE 10

This example describes the preparation of

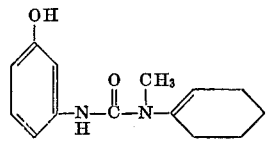

A tetrahydrofuran mixture consisting of 17.4 parts of the carbamoyl chloride, prepared in Example 9, 10.9 parts m-aminophenol and 10.1 parts triethyl amine was stirred at 25–30° C. for about 8 days. The reaction mixture was then filtered, and the filtrate was vacuum treated to remove solvent to give a solid. Solid melted 107–118° C. Solid washed with water and dried—melting point 118–126° C. Recrystallized from cold isopropanol—melting point of recrystallized solid 129.5–131° C.

Calc'd for $C_{14}H_{18}N_2O_2$ (percent): C, 68.27; H, 7.36; N, 11.38. Found (percent): C, 68.26; H, 7.53; N, 11.51.

EXAMPLE 11

This example describes the preparation of

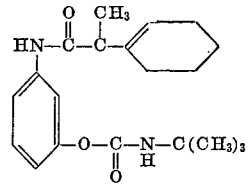

To a solution of 2 parts of the enurea prepared in Example 10 in benzene was added 0.83 part tertiary butylisocyanate and 4.2 parts triethylamine. Mixture was stirred for several days during which time white crystals were deposited. The crystals were collected and vacuum dried. The solid had a melting point of 95–98° C. and was identified by nuclear magnetic resonance as the desired product.

Calc'd for $C_{19}H_{27}N_3O_3$ (percent): C, 66.0; H, 7.83; N, 12.18. Found (percent): C, 66.59; H, 7.68; N, 11.44.

EXAMPLE 12

This example describes the preparation of

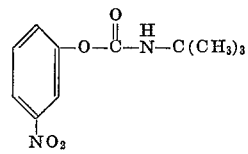

To a filtered solution of 21.5 parts m-nitro-phenol in hot benzene was added 16 parts tertiary-butyl isocyanate and 1.1 parts triethylamine. The mixture was refluxed for about 8 hours, and then the solvent was removed. The residue was dissolved in methylene chloride, washed 5 times with 1% sodium hydroxide solution, dried over magnesium sulfate and the solvent removed yielding a solid melting at 79.5–80.5° C.

Calc'd for $C_{11}H_{14}N_2O_4$ (percent): C, 55.46; H, 5.92; N, 11.76. Found (percent): C, 56.60; H, 5.68; N, 11.49.

EXAMPLE 13

This example describes the reduction to the amine of the nitro group of the compound prepared in Example 12.

To a suitable vessel containing 25 parts of the compound prepared in Example 12, in ethanol was added palladium on charcoal catalyst, small amount (about 0.1 part) of acetic acid and the vessel charged with hydrogen to a gauge reading of 60 pounds per square inch. After the required hydrogen uptake was obtained, the mixture was filtered and the solvent removed yielding the solid amine.

EXAMPLE 14

This example describes the preparation of

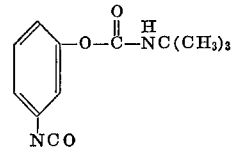

To a stirred phosgene saturated solution of hot ethyl acetate was added in small increments a solution of 10 parts of the amine prepared in Example 13 in ethyl acetate. Phosgene was introduced into the reaction mixture throughout the addition of amine. The mixture was then refluxed for two hours and the solvent removed to yield a dark amber liquid, which solidified on further stripping of solvent. The solid was recrystallized from a heptane-methylcyclohexane mixture, yielding a solid melting at 85–87.5° C. The product was identified by IR and NMR spectra.

Calc'd for $C_{12}H_{14}N_2O_3$ (percent): C, 61.52; H, 6.02; N, 11.96. Found (percent): C, 61.02; H, 6.16; N, 11.04.

EXAMPLE 15

This example describes the preparation of

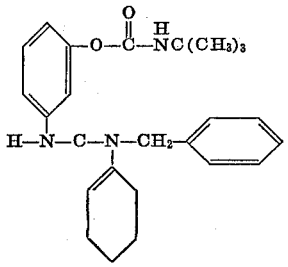

To 3.5 parts of the isocyanate, prepared in Example 14, in benzene was added with stirring 2.8 parts of N-cyclohexylidine-N-benzyl amine in benzene. The resultant mixture stood at room temperature for several days and then filtered. The solvent was removed from the filtrate yielding a solid which was recrystallized from a toluene-methylcyclohexane mixture. Product was identified by NMR spectra.

Calc'd for $C_{25}H_{31}N_3O_3$ (percent): C, 71.23; H, 7.41; N, 9.97. Found (percent): C, 72.27; H, 7.48; N, 9.17.

Following the procedure of the foregoing examples and using the appropriate isocyanate or thioisocyanate and cyclohexylidene amine reactants, the following 1-(1-cyclohexen-1-yl)ureas were prepared.

Example:
(16) 1-(1-cyclohexen-1-yl)-1-(ethyl)-3-(butyl)urea
(17) 1-(1-cyclohexen-1-yl)-1-(allyl)-3-(m-chlorophenyl) urea
(18) 1-(1-cyclohexen-1-yl)-1-(butenyl-2)-3-(phenyl) urea
(19) 1-(1-cyclohexen-1-yl)-1-(sec-butyl)-3-(2,6-dichlorophenyl) urea
(20) 1-(1-cyclohexen-1-yl)-1-(methoxyethyl)-3-(2,4,6-trichlorophenyl) urea
(21) 1-(1-cyclohexen-1-yl)-1-(methoxypropyl)-3-(allyl) urea
(22) 1-(1-cyclohexen-1-yl)-1-(propoxypropyl)-3-(3-methylbutenyl-1) urea
(23) (1-cyclohexen-1-yl)-1-(methoxyamyl)-3-(2,4-dinitrophenyl) urea
(24) 1-(1-cyclohexen-1-yl)-1-(butyl)-3-(methyl)-2-thiourea
(25) 1-(1-cyclohexen-1-yl)-1-(hexyl)-3-(allyl)-2-thiourea
(26) 1-(1-cyclohexen-1-yl)-1-(allyl)-3-(ethyl)-2-thiourea
(27) 1-(1-cyclohexen-1-yl)-1-(n-pentenyl-1)-3-(phenyl)-2-thiourea
(28) 1-(1-cyclohexen-1-yl)-1-(methoxypropyl)-3-(m-nitrophenyl)-2-thiourea
(29) 1-(1-cyclohexen-1-yl)-1-(ethyl)-3-(2,4-dinitrophenyl)-2-thiourea
(30) 1-(1cyclohexen-1-yl)-1-(ethoxyethyl)-3-(p-chlorophenyl)-2-thiourea
(31) 1-(1-cyclohexen-1-yl)-1-(methoxyhexyl)-3-(methyl)-2-thiourea
(32) 1-(1-cyclohexen-1-yl)-1-(methyl)-3-(buten-1-yl)-2-thiourea
(33) 1-(1-cyclohexen-1-yl)-1-(methyl)-3-(p-cyanophenyl)-2-thiourea
(34) 1-(2-methyl-6-isopropyl-1-cyclohexen-1-yl)-1-methyl-3-(o-fluorophenyl) urea
(35) 1-(1-cyclopenten-1-yl)-1-methyl-3-(o-fluorophenyl) urea
(36) 1-(2-methyl-6-ethyl-1-cyclohexen-1-yl)-1-methyl-3-phenylurea
(37) 1-(1-cyclohexen-1-yl)-1-(ethyl)-3-(p-methylphenyl) urea
(38) 1-(1-cyclohexen-1-yl)-1-(methyl)-3-(2,4-dimethylphenyl) urea
(39) 1-(1-cyclohexen-1-yl)-1-(methyl)-3-(2,4,6-trimethylphenyl) urea
(40) 1-(2-ethyl-1-cyclopenten-1-yl)-propyl-3-(o-fluorophenyl) urea
(41) 1-(2-methyl-6-isopropyl-1-cyclohepten-1-yl)-1-methyl-3-(o-fluorophenyl) urea
(42) 1-(2-methyl-1-cyclohexen-1-yl)-1-methyl-3-(o-fluorophenyl) thiourea
(43) 1-(1-cyclohexen-1-yl)-1-(methyl)-3-(3,4-dimethylphenyl) urea
(44) 1-(1-cyclohexen-1-yl)-1-(methyl)-3-(3,4-dimethylphenyl)-2-thiourea
(45) 1-(1-cyclohexen-1-yl)-1-(methyl)-3-(m-methylphenyl)-2-thiourea
(46) 1-(2-methyl-1-cyclohexen-1-yl)-1-ethyl-3-(3-chloro-4-methoxyphenyl) urea
(47) 1-(2-isopropyl-1-cyclohepten-1-yl)-1-methyl-3-(o-fluorophenyl) urea
(48) 1-(1-cyclohexen-1-yl)-1-methyl-3-(m-trifluoromethylphenyl) urea
(49) 1-(1-cyclohexen-1-yl)-1-methyl-3-(3-chloro-4-methoxyphenyl) urea
(50) 1-(2-methyl-1-cyclohexen-1-yl)-1-methyl-3-(3-N-tertiary butylcarbamoyloxyphenyl) urea
(51) 1-(6-methyl-1-cyclohexen-1-yl)-1-methyl-3-(3-N-tertiary butylcarbamoyloxyphenyl) urea
(52) 1-(1-cyclohexen-1-yl)-1-methyl-3-(3-N-hexyl carbamoyloxyphenyl) urea
(53) 1-(1-cyclohexen-1-yl)-1-methyl-3-(o-trifluoromethylphenyl) urea
(54) 1-(1-cyclohexen-1-yl)-1-methyl-3-(3-N-n-butyl carbamoyloxyphenyl) urea
(55) 1-(1-cyclohexen-1-yl)-1-methyl-3-(3-N-methyl carbamoyloxyphenyl) urea
(56) 1-(1-cyclohexen-1-yl)-1-methyl-3-(3-N,N-diethyl carbamoyloxyphenyl) urea
(57) 1-(1-cyclohexen-1-yl)-1-methyl-3-phenyl urea
(58) 1-(1-cyclohexen-1-yl)-1-methyl-3-(3-chloro-4-methylphenyl) urea
(59) 1-(1-cyclohexen-1-yl)-1-methyl-3-(2-biphenyl) urea
(60) 1-(1-cyclohexen-1-yl)-1-methyl-3-phenoxymethyl urea
(61) 1-(1-cyclohexen-1-yl)-1-methyl-3-(3-N-isopropyl carbamoyloxyphenyl) urea
(62) 1-(1-cyclohexen-1-yl)-1-methyl-3-(3-N-n-propyl carbamoyloxyphenyl) urea
(63) 1-(1-cyclohexen-1-yl)-1-methyl-3-(3-N-ethyl carbamoyloxyphenyl) urea
(64) 1-(1-cyclohexen-1-yl)-1-methyl-3-(4-fluorophenyl) urea
(65) 1-(1-cyclohexen-1-yl)-1-methyl-3-(4-ethoxyphenyl) urea
(66) 1-(1-cyclohexen-1-yl)-1-methyl-3-(4-methoxyphenyl) urea
(67) 1-(1-cyclohexen-1-yl)-1-methyl-3-(4-methylphenyl) urea
(68) 1-(1-cyclohexen-1-yl)-1-methyl-3-(2,5-dichlorophenyl) urea
(69) 1-(1-cyclohexen-1-yl)-1-methyl-3-n-butyl urea
(70) 1-(1-cyclohexen-1-yl)-1-methyl-3-(2-methylphenyl) urea
(71) 1-(1-cyclohexen-1-yl)-1-methyl-3-[4-(4'-chlorophenoxylphenyl] urea
(72) 1-(1-cyclohexen-1-yl)-1-methyl-3-(3-methyl phenyl) urea
(73) 1-(1-cyclohexen-1-yl)-1-methyl-3-methylenecarboethoxy) urea
(74) 1-(1-cyclohexen-1-yl)-1-methyl-3-(3-chlorophenyl) urea
(75) 1-(1-cyclohexen-1-yl)-1-methyl-3-(2-chlorophenyl) urea
(76) 1-(1-cyclohexen-1-yl)-1-methyl-3-(2-fluorophenyl) urea
(77) 1-(1-cyclohexen-1-yl)-1-methyl-3-(4-bromophenyl) urea

(78) 1-(2,6-dimethyl-1-cyclohexen-1-yl)-1-methyl-3-(3,4-dichlorophenyl) urea
(79) 1-(2,6-dimethyl-1-cyclohexen-1-yl)-1-methyl-3-(4-chlorophenyl) urea
(80) 1-(2,6-dimethyl-1-cyclohexen-1-yl)-1-methyl-3-phenylurea
(81) 1-(2-n-propyl-1-cyclohexen-1-yl)-1-methyl-3-(4-chlorophenyl) urea
(82) 1-(6-n-propyl-1-cyclohexen-1-yl)-1-methyl-3-(4-chlorophenyl) urea
(83) 1-(2-n-propyl-1-cyclohexen-1-yl)-1-methyl-3-phenylurea
(84) 1-(6-n-propyl-1-cyclohexen-1-yl)-1-methyl-3-phenylurea
(85) 1-(2-methyl-1-cyclohexen-1-yl)-1-methyl-3-(3,4-dichlorophenyl) urea
(86) 1-(2-methyl-1-cyclohexen-1-yl)-1-methyl-3-(4-chlorophenyl) urea
(87) 1-(6-methyl-1-cyclohexen-1-yl)-1-methyl-3-(4-chlorophenyl) urea
(88) 1-(2-methyl-1-cyclohexen-1-yl)-1-methoxy-ethyl-3-(3,4-dichlorophenyl) urea
(89) 1-(6-methyl-1-cyclohexen-1-yl)-1-methoxy-ethyl-3-(3,4-dichlorophenyl) urea
(90) 1-(2-methyl-1-cyclohexen-1-yl)-1-methoxy-isopropyl-3-(3,4-dichlorophenyl) urea
(91) 1-(2-ethyl-1-cyclohexen-1-yl)-1-ethoxy-ethyl-3-(o-fluorophenyl) urea
(92) 1-(2-methyl-1-cyclohexen-1-yl)-1-methyl-3-(3,4-dichlorophenyl) urea
(93) 1-(6-methyl-1-cyclohexen-1-yl)-1-methyl-3-(3,4-dichlorophenyl) urea
(94) 1-(3,5-dimethyl-1-cyclohexen-1-yl)-1-methoxy-ethyl-3-(3,4-dichlorophenyl) urea
(95) 1-(1-cyclohexen-1-yl)-1-methyl-3-(4-carbomethoxy phenyl) thiourea
(96) 1-(1-cyclohexen-1-yl)-1-methyl-3-n-butyl thiourea
(97) 1-(1-cyclohexen-1-yl)-1-methyl-3-(2-chlorophenyl) thiourea
(98) 1-(1-cyclohexen-1-yl)-1-methyl-3-(4-nitrophenyl) thiourea
(99) 1-(1-cyclohexen-1-yl)-1-methyl-3-ethylthiourea
(100) 1-(1-cyclohexen-1-yl)-1-methyl-3-(4-nitrophenyl) thiourea
(101) 1-(1-cyclohexen-1-yl)-1-dodecyl-3-(3,4-dichlorophenyl) thiourea
(102) 1-(1-cyclohexen-1-yl)-1-methyl-3-(3,4-dichlorophenyl) thiourea
(103) 1-(1-cyclohexen-1-yl)-1-methyl-3-(3,4-dichlorophenyl) urea
(104) 1-(1-cyclohexen-1-yl)-1-methyl-3-methylthiourea
(105) 1-(1-cyclohexen-1-yl)-1-mehyl-3,3-dimethyl urea
(106) 1-(1-cyclopenten-1-yl)-1-methyl-3-(4-nitrophenyl) urea
(107) 1-(2-methyl-1-cyclopenten-1-yl)-1methyl-3-(3,4-dichlorophenyl) urea
(108) 1-1-cycloocten-1-yl)-1-ethyl-3-(2-fluorophenyl) urea
(109) 1-(1-cyclohexen-1-yl)-1-methyl-3-(3-N-1-cyclohexen-1-yl carbamoyloxy phenyl) urea
(110) 1-(1-cyclohexen-1-yl)-1-methyl-3-(3-N-methyl-N-isobutenylcarbamoyloxyphenyl) urea
(111) 1-(1-cyclohexen-1-yl)-1-methyl-3-(3-piperdyl carbamoyloxyphenyl) urea The term "phytotoxicant" as used herein and in the appended claims means materials having a modifying effect upon the growth of plant systems. Such modifying effects include all deviations from natural development, for example, killing, retardation, defoliation, desiccation, regulation, stunting, tillering, stimulation, dwarfing, and the like. In like manner, "phytotoxic" and "phytotoxicity" are used to identify the growth modifying activity of the compounds and compositions of this invention.

The term "plant system" as used herein and in the appended claims means germinant seeds, emerging seedlings and established vegetation including the roots and above-ground portions.

EXAMPLE 112 (TABLE I)

The pre-emergent phytotoxicity or representative N-(1-cycloalken-1-yl) ureas of this invention is demonstrated as follows: A good grade of top soil is placed in aluminum pans and compacted to a depth of ⅜" to ½" from the top of each pan. A pedetermined number of seeds of each of several plant species are placed on top of the soil in the pans. The phytotoxic compositions are applied to the soil by two methods:

(1) application to the surface of the top soil layer and
(2) admixture with or incorporation in the top soil layer.

In the surface application method, the seeds are covered with a ⅜" layer of prepared soil and the pan leveled. The phytotoxic composition is applied by spraying the surface of the top layer of soil, prior to watering the seeds, with a solution containing a sufficient amount of active ingredient to obtain the desired rate per acre on the soil surface. In the soil incorporation method, the soil required to fill the pans is weighed and admixed with a phytotoxic composition containing a known amount of active ingredient. The seeds are then covered with the admixture and leveled. Initial watering is carried out by permitting the soil to absorb moisture through the apertured bottom of the pans.

The seed containing pans are placed on a wet sand bench and maintained for approximately 14 days under ordinary conditions of sunlight and watering. The plants are observed at the end of approximately 14 days and the results recorded. The phytotoxic activity index is based on the average percent germination of each seed lot. The activity index is converted to a relative numerical scale for the sake of brevity and simplicity in the examples.

The pre-emergent phytotoxic activity index used in the following example is defined as follows:

| Numerical scale: | Phytotoxic activity |
|---|---|
| 0 | No phytotoxicity. |
| 1 | Slight phytotoxicity. |
| 2 | Moderate phytotoxicity. |
| 3 | Severe phytotoxicity. |

The pre-emergent phytotoxic activity of some of the N-(1-cycloalken-1-yl) ureas of this invention is recorded in Table I for various application rates of the active ingredients in both surface and soil-incorporation applications. In Table I the 5 lb./acre applications are made by the surface application method and the 1 lb./acre applications are made by the soil incorporation method. Results and further details are given below in Table I.

TABLE I.—PRE-EMERGENT PHYTOTOXIC ACTIVITY OF VARIOUS N-(1-CYCLOHEXEN-1-YL) UREAS

| Plant species | Compound | | | | | |
|---|---|---|---|---|---|---|
| | 5 lbs./acre | | | | | 1 lb./acre |
| | (a) | (b) | (c) | (d) | (e) | (a) |
| Morning glory | 3 | 0 | 0 | 3 | 2 | 0 |
| Wild oats | 1 | 0 | 0 | 3 | 1 | 1 |
| Brome grass | 1 | 0 | 1 | 3 | 1 | 1 |
| Rye grass | 3 | 1 | 1 | 3 | 1 | 1 |
| Radish | 3 | 0 | 0 | 2 | 1 | 0 |
| Sugar beets | 3 | 2 | 1 | 3 | 3 | 1 |
| Foxtail | 3 | 2 | 2 | 3 | 2 | 3 |
| Crabgrass | 3 | 3 | 3 | 3 | 3 | 3 |
| Pigweed | 3 | 3 | 3 | 3 | 3 | 3 |
| Soybean | 1 | 0 | 1 | 1 | 1 | 0 |
| Wild buckwheat | 3 | 3 | 1 | 2 | 2 | 0 |
| Tomato | 3 | 0 | 2 | 3 | 1 | 1 |
| Sorghum | 3 | 0 | 0 | 3 | 2 | 1 |

NOTE.—Compound (a)=1-(1-cyclohexen-1-yl)-3-(3,4-dichlorophenyl)-1-methylurea; Compound (b)=1-1-cyclohexene-1-yl)-3-(3,4-dichlorophenyl) 1-methyl-2-thiourea; Compound (c)=1-(1-cyclohexen-1-yl)-3-(o-nitrophenyl)-1-methyl urea; Comuound (d)=1-(1-cyclohexen-1-yl)-3-(2-fluorophenyl)-1-methyl urea: Compound (e)=1-(1-cyclohexen-1-yl)-3-(3-t-butylcarbamoyloxy)-1-methylurea The data in Table I illustrate the general phytotoxic activity as well as the selective phytotoxic activity of some of the N-(1-cycloalken-1-yl) ureas of this invention. It will be noted that unusual grass specificity is obtained at low application rates, for example at 1 lb./acre with N-(1-cyclohexen-1-yl)-3-(3,4-dichlorophenyl) - 1 - methyl urea.

EXAMPLE 113 (TABLE II)

This example demonstrates the post-emergent phytotoxic activity of representative N-(1-cycloalken-1-yl) ureas of this invention. The active ingredients are applied in spray form to 14-day old specimens of the same plant species used in the pre-emergent tests above. The phytotoxic sprays are acetone-water solutions containing 0.5% and 0.2% active ingredient. The solutions are applied to the plants in different sets of pans at rates equal to approximately 10 and 4 pounds of active ingredients per acre. The treated plants are placed in a greenhouse and the effects are observed and recorded after approximately 14 days.

The post-emergent phytotoxic activity index used in this example is based on the average percent injury of each plant species and is defined as follows:

| Numerical scale: | Phytotoxic activity |
| --- | --- |
| 0 | No phytotoxicity. |
| 1 | Slight phytotoxicity. |
| 2 | Moderate phytotoxicity. |
| 3 | Severe phytotoxicity. |
| 4 | Plants dead. |

The identification of the plants used is the same in the above pre-emergent tests. Results and further details are given below in Table II.

TABLE II

TABLE II.—POST-EMERGENT PHYTOTOXIC ACTIVITY OF VARIOUS 1-(1-CYCLOHEXEN-1-YL) UREAS

| | Compound | | | | | | | |
| --- | --- | --- | --- | --- | --- | --- | --- | --- |
| | 10 lb./acre | | | | | 4 lb./acre | | |
| Plant species | (a) | (c) | (d) | [1] (e) | (f) | (a) | (b) | (c) |
| Morning glory | 4 | 1 | 4 | 4 | 4 | 3 | 3 | 2 |
| Wild oats | 2 | 1 | 2 | 1 | 4 | 1 | 0 | 2 |
| Brome grass | 2 | 1 | 1 | 1 | 4 | 2 | 1 | 1 |
| Rye grass | 1 | 1 | 1 | 0 | 4 | 1 | 1 | 1 |
| Radish | 4 | 4 | 4 | 3 | 4 | 4 | 3 | 2 |
| Sugar beets | 4 | 3 | 4 | 3 | 4 | 4 | 4 | 4 |
| Foxtail | 4 | 3 | 1 | 1 | 4 | 1 | 1 | 1 |
| Crabgrass | 4 | 3 | 1 | 2 | 4 | 1 | 1 | 1 |

[1] Compound (e) was tested on 3-week old plants.
NOTE.—Compound (a) (b) (c), see footnotes bottom of Table I. Compound (d)=1-(1-cyclohexen-1-yl)-3-(p-chlorophenyl)-1-methyl 2-thiourea. Compound (e)=1-(1-cyclohexen-1-yl)-3-(2-fluorophenyl)-1-methylurea. Compound (f)=1-(1-cyclohexen-1-yl)-3-(3-t-butylcarbamoyloxy)-1-methylurea.

As mentioned hereinbefore the phytotoxic compositions of this invention comprise an active ingredient and one or more phytotoxic adjuvants which can be solid or liquid extenders, carriers, diluents, conditioning agents and the like. Preferred phytotoxic compositions containing the active ingredients of this invention have been developed so that the active ingredients can be used to the greatest advantage to modify the growth of plant systems in soil. The preferred compositions comprise certain wettable powders, aqueous suspensions, dust formulations, granules, emulsifiable oils and solutions in solvents. In general these preferred compositions can all contain one or more surface-active agents.

Surface-active agents which can be used in the phytotoxic compositions of this invention are set out, for example, in Searle U.S. Pat. 2,426,417, Todd U.S. Pat. 2,655,447, Jones U.S. Pat. 2,412,510 and Lenher U.S. Pat. 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulletin E-607 of the Bureau of Entomology and Plant Quarantine of the U.S.D.A. In general less than 15 parts by weight of phytotoxic composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonate, sulfonated vegetable oils and ditertiary acetylinic glycols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts of active ingredient, from about 0.25 to about 3.0 parts of wetting agent, from about 0.25 to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Aqueous suspensions are usually prepared by mixing together an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely-divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing, finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for phytotoxic dusts include micaceous talcs, pyrophyllite, dense kaolin clays, ground calcium phosphate rock and tobacco dust. The dusts usually contain from about 0.5 to 99 parts active ingredient, 0 to 50 parts grinding aid, 0 to 3 parts wetting agent and 1 to 99.5 parts dense solid extender, all parts being by weight based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and antifoam agents may also be found as components of a dust.

Emulsifiable oils are usually solutions of active ingredient in water-immiscible solvents together with a surfactant. Suitable solvents for the active ingredient of this invention include hydrocarbons and water-immiscible ethers, esters or ketones. Suitable surfactants are anionic, cationic and non-ionic such as alkyl aryl polyethoxy alcohols, alkyl and alkyl aryl polyether alcohols, polyethylene sorbitol or sorbitan fatty acid esters, polyethylene glycol fatty esters, fatty alkylol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 10 parts surfactant and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surfactant such as those listed hereinbefore under wettable powders can be present in the composition. Natural clays, pyrophyllites and vermiculite are examples of operable classes of particulate mineral extenders. The preferred extenders are the porous, absorptive, preformed particles such as preformed and screened particulate attapulgite or heat expended, particulate vermiculite, and the finely-divided clays such as kaolin clays, hydrated attapulgite or bentonitic clays. These extenders are sprayed or blended with the active ingredient to form the phytotoxic granules.

The mineral particles which are used in the granular phytotoxic compositions of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular phytotoxic compositions of this invention generally contain from about 1 part to about 30 parts by weight of N-(1-cycloalken-1-yl) urea per 100 parts by weight of clay and 0 to about 5 parts by weight of wetting agent per 100 parts by weight of clay. The preferred phytotoxic granular compositions contain from about 5 parts to about 25 parts by weight of active ingredient per 100 parts by weight of clay.

The phytotoxic compositions of this invention can also contain other additaments, for example, fertilizers, other phytotoxicants, pesticides and the like, used as adjuvant or in combination with any of the above-described adjuvants.

The compounds of this invention may be used in combination with known herbicides in order to provide enhanced biological effectiveness. The use of various herbicides in combination at the time of a single application or sequentially is common in practice. Herbicides which may be used in combination with the compounds of this invention include but are not limited to:

Substituted phenoxyaliphatic acids such as 2,4-dichlorophenoxyacetic acid; 2,4,5-trichlorophenoxyacetic acid, 2-methyl-4-chlorophenoxyacetic acid and the salts, esters and amides thereof; triazine derivatives, such as 2-chloro-4 - ethylamino - 6 - isopropylamino-s-triazine; 2,4-bis(isopropylamino) - 6 - methoxy-s-triazine and 2-methylmercapto - 4,6 - bis(isopropylamino)-s-triazine; urea derivatives such as 3 - (3,4 - dichlorophenyl)-1-,1-dimethylurea and 3 - (m - trifluoromethylphenyl)-1,1-dimethylurea and 3 - (3,4 - dichlorophenyl)-1-methoxy-1-methylurea; pyridylium derivatives such as 1:1'-ethylene-2,2-dipyridylium dihalide; acetanilides such as N-isopropyl-α-chloroacetanilide, and 2 - chloro - 2',6' - diethyl-N-methoxymethyl acetanilide; acetamides such as N,N-diallyl-α-chloroacetamide, carbamates such as ethyl-N,N-di-n-propylthiolcarbamate, and 2,3-dichloroallyl diisopropylthiolcarbamate; substituted uracils such as 5-bromo-3-sec-butyl-6-methyluracil, substituted anilines such as N,N-dipropyl-α,α,α- trifluoro - 2,6 - dinitro-p-toluidine; pyridazone derivatives such as 5-amino-4-chloro-2-phenyl-3-(2H)-pyridazinone, and the like.

Fertilizers useful in combination with the active ingredients include, for example ammonium nitrate, urea and superphosphate. Other useful additaments include materials in which plant organisms take root and grow such as compost, manure, humus, sand and the like.

When operating in accordance with the present invention, effective amounts of the N-(1-cycloalken-1-yl) ureas are dispersed on or in the soil or plant growth media and applied to plant systems in any convenient fashion. Application to the soil or growth media can be carried out by simply mixing with the media, by applying to the surface of the soil and thereafter dragging or discing into the soil to the desired depth, or by employing a liquid carrier to accomplish the penetration and impregnation. The application of liquid and particulate solid phytotoxic compositions to the surface of soil or to plant systems can be carried out by conventional methods, e.g., power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the phytotoxicants.

The application of an effective or phytotoxic amount of the N-(1-cycloalken-1-yl) ureas to the soil or growth media or plant systems is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific N-(1-cycloalken-1-yl) urea employed. In foliar treatment for the control or modification of vegetative growth, the active ingredients are applied in amounts from about 1 to about 50 or more pounds per acre. In applications to soil for the control or modification of the growth of germinant seeds, emerging seedlings and established vegetation, the active ingredients are applied in amounts from about 1 to about 50 or more pounds per acre. It is believed that one skilled in the art can readily determine from this specification, including examples, the application rate for any specific situation.

The terms "soil" and "growth media" are employed in the present specification and claims in their broadest sense to be inclusive of all conventional "soils" as defined in Webster's New International Dictionary, Second Edition, Unabridged (1961). Thus, the terms refer to any substance or media in which vegetation may take root and grow, and are intended to include not only earth but compost, manure, muck, humus, sand and the like, adapted to support plant growth.

What is claimed is:
1. A compound of the formula

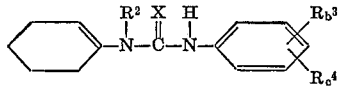

wherein $R^2$ is selected from the group consisting of alkyl having from 1 to 12 carbon atoms and alkoxyalkyl having from 2 to 8 carbon atoms, each $R^3$ is independently selected from the group consisting of alkyl having from 1 to 4 carbon atoms and halogen, each $R^4$ is independently selected from the group consisting of cyano and nitro, $b$ is one of the integers from 0 to 3, inclusive, $c$ is one of the integers from 0 to 2, inclusive, provided that the total of $b$ and $c$ is a maximum of three, and X is selected from the group consisting of oxygen and sulfur.

2. A compound in accordance with claim 1, in which X is oxygen.
3. A compound in accordance with claim 2 in which $R^2$ is alkyl.
4. A compound in accordance with claim 3 in which $R^3$ is halogen.
5. A compound of claim 4 wherein $c$ is zero.
6. A compound in accordance with claim 4, in which $R^3$ is fluorine and $b$ is one.
7. A compound in accordance with claim 6, in which the fluorine is in the 2-position.
8. A compound in accordance with claim 4, in which $R^3$ is chlorine and $b$ is two.

9. 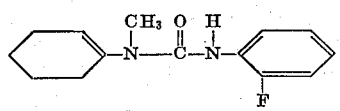

10. 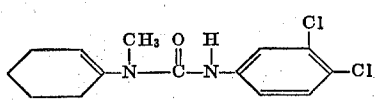

11. 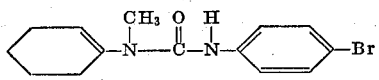

References Cited
UNITED STATES PATENTS

| | | | |
|---|---|---|---|
| 3,385,693 | 5/1968 | Luckenbaugh | 260—553 A |
| 2,723,192 | 11/1955 | Todd | 260—553 A |
| 2,726,150 | 1/1955 | Wolter | 260—553 A |

OTHER REFERENCES

Chupp et al., J. Org. Chem., vol. 33, No. 6 (June 1968) pp. 2357-61.

BERNARD HELFIN, Primary Examiner

M. W. GLYNN, Assistant Examiner

U.S. Cl. X.R.

424—244, 248, 267, 300, 322; 71—88, 94, 95, 99, 105, 106, 107, 120; 252—106, 353, 357, 363.5; 260—239 B, 247.1, 247.2 B, 293.73, 293.74, 294.8 H, 326.3, 465 B, 468 C, 471 R, 479 C, 482 C, 552 R, 999